(12) United States Patent
Line et al.

(10) Patent No.: US 9,168,852 B2
(45) Date of Patent: Oct. 27, 2015

(54) CLIMATE COMFORT SEAT ASSEMBLY

(71) Applicant: Ford Global Technologies, LLC, Dearborn, MI (US)

(72) Inventors: Johnathan Andrew Line, Northville, MI (US); Paul Bryan Hoke, Plymouth, MI (US); Clay Wesley Maranville, Ypsilanti, MI (US); John W. Jaranson, Dearborn, MI (US); Michael Kolich, Windsor (CA); Daniel Ferretti, Commerce Township, MI (US); Jeroen Lem, Maastricht (NL)

(73) Assignee: Ford Global Technologies, LLC, Dearborn, MI (US)

( * ) Notice: Subject to any disclaimer, the term of this patent is extended or adjusted under 35 U.S.C. 154(b) by 77 days.

(21) Appl. No.: 13/692,295

(22) Filed: Dec. 3, 2012

(65) Prior Publication Data
US 2014/0152058 A1 Jun. 5, 2014

(51) Int. Cl.
A47C 7/72 (2006.01)
B60N 2/56 (2006.01)

(52) U.S. Cl.
CPC ............... *B60N 2/56* (2013.01); *B60N 2/5607* (2013.01); *B60N 2/5614* (2013.01); *B60N 2/5621* (2013.01); *B60N 2/5657* (2013.01); *B60N 2/5678* (2013.01)

(58) Field of Classification Search
CPC ...... B60N 2/5614; B60N 2/56; B60N 2/5621; B60N 2/5678; B60N 2/5607
USPC ............. 297/180.12, 180.15, 180.13, 180.14, 297/180.11
See application file for complete search history.

(56) References Cited

U.S. PATENT DOCUMENTS

| 5,176,424 | A * | 1/1993 | Tobita et al. ............... 297/284.1 |
| 5,354,117 | A * | 10/1994 | Danielson et al. ....... 297/180.15 |
| 5,613,730 | A * | 3/1997 | Buie et al. ............... 297/180.12 |
| 6,196,627 | B1 | 3/2001 | Faust et al. |
| 6,247,751 | B1 * | 6/2001 | Faust et al. ............... 297/180.13 |
| 6,254,179 | B1 * | 7/2001 | Kortum et al. ........... 297/180.12 |
| 6,869,139 | B2 | 3/2005 | Brennan et al. |
| 7,168,758 | B2 | 1/2007 | Bevan et al. |
| 7,197,801 | B2 | 4/2007 | Bajic et al. |
| 7,229,129 | B2 | 6/2007 | White et al. |
| 7,261,371 | B2 | 8/2007 | Thunissen et al. |
| 7,322,643 | B2 | 1/2008 | Ishima et al. |
| 7,356,912 | B2 | 4/2008 | Iqbal et al. |
| 7,510,239 | B2 | 3/2009 | Stöwe |

(Continued)

FOREIGN PATENT DOCUMENTS

CN 101115642 A 1/2008

OTHER PUBLICATIONS

State Intellectual Property Office of the People'S Republic of China, "Notification of First Office Action," Aug. 5, 2015, 54 pages, Beijing, China.

*Primary Examiner* — Kristina Junge
(74) *Attorney, Agent, or Firm* — Vichit Chea; Price Heneveld LLP

(57) ABSTRACT

A vehicle seating assembly includes a seat structure. A carrier is disposed on the seat structure and includes a matrix of fluid transfer lines. A spacer material is positioned over the carrier. A trim cover is disposed over the spacer material. A desiccant is made from a volcanic ash and is supported by the seat structure. The matrix of fluid transfer lines thermodynamically influences a relative temperature of the trim cover through both the carrier and the desiccant.

20 Claims, 4 Drawing Sheets

(56) References Cited

U.S. PATENT DOCUMENTS

| | | |
|---|---|---|
| 7,549,707 B2 | 6/2009 | Brennan et al. |
| 7,637,573 B2 | 12/2009 | Bajic et al. |
| 7,647,780 B2 | 1/2010 | Aoki et al. |
| 7,695,062 B2 | 4/2010 | Stöwe |
| 7,731,279 B2 | 6/2010 | Asada et al. |
| RE41,765 E | 9/2010 | Gregory et al. |
| 7,828,050 B2 | 11/2010 | Esaki |
| 7,857,395 B2 | 12/2010 | Kikuchi et al. |
| 7,866,017 B2 | 1/2011 | Knoll |
| 7,931,330 B2 | 4/2011 | Itou et al. |
| 7,966,835 B2 | 6/2011 | Petrovski |
| 7,971,931 B2 | 7/2011 | Lazanja et al. |
| 2003/0230913 A1* | 12/2003 | Buss et al. ............... 297/180.14 |
| 2004/0195870 A1 | 10/2004 | Bohlender et al. |
| 2006/0038432 A1 | 2/2006 | Koehler |
| 2006/0151455 A1 | 7/2006 | Stowe |
| 2006/0158011 A1 | 7/2006 | Marlovits et al. |
| 2006/0175877 A1 | 8/2006 | Alionte et al. |
| 2006/0249996 A1 | 11/2006 | Eberl et al. |
| 2007/0063551 A1 | 3/2007 | Gasic et al. |
| 2007/0084220 A1 | 4/2007 | Asada et al. |
| 2007/0158981 A1 | 7/2007 | Almasi et al. |
| 2007/0246975 A1 | 10/2007 | Bier et al. |
| 2007/0277313 A1 | 12/2007 | Terech |
| 2009/0033130 A1 | 2/2009 | Marquette et al. |
| 2009/0079236 A1 | 3/2009 | Itou et al. |
| 2009/0096256 A1 | 4/2009 | Kikuchi et al. |
| 2009/0127894 A1 | 5/2009 | Bargheer et al. |
| 2009/0134675 A1 | 5/2009 | Pfahler |
| 2009/0218855 A1 | 9/2009 | Wolas |
| 2009/0302646 A1 | 12/2009 | Baur et al. |
| 2009/0322124 A1 | 12/2009 | Barkow et al. |
| 2010/0045079 A1 | 2/2010 | Andersson et al. |
| 2010/0207431 A1 | 8/2010 | Petzel et al. |
| 2010/0327636 A1 | 12/2010 | Stoll et al. |
| 2011/0048033 A1 | 3/2011 | Comiskey et al. |
| 2011/0109127 A1 | 5/2011 | Park et al. |
| 2011/0221242 A1 | 9/2011 | Juric |
| 2011/0253340 A1 | 10/2011 | Petrovski |
| 2011/0266842 A1 | 11/2011 | Lazanja et al. |
| 2013/0189511 A1* | 7/2013 | Cernohous et al. ........ 428/314.4 |

* cited by examiner

US 9,168,852 B2

CLIMATE COMFORT SEAT ASSEMBLY

FIELD OF THE INVENTION

The present invention generally relates to a seat cushion and a seat back, and more particularly to a climate comfort seat assembly for a vehicle.

BACKGROUND OF THE INVENTION

Vehicle seat comfort has become increasingly important as passengers take longer trips. Providing air circulation in the seat can increase the comfort of passengers.

SUMMARY OF THE INVENTION

According to one aspect of the present invention, a vehicle seating assembly includes a seat structure. A carrier is disposed on the seat structure and includes a matrix of fluid transfer lines. A spacer material is positioned over the carrier. A trim cover is disposed over the spacer material. A desiccant is made from a volcanic ash and is supported by the seat structure. The matrix of fluid transfer lines thermodynamically influences a relative temperature of the trim cover through both the carrier and the desiccant.

According to another aspect of the present invention, a vehicle seating assembly includes a seat structure supporting a thermoelectric device. A carrier is disposed on the seat structure and includes a thermal seat manifold. A spacer material is positioned over the carrier. A trim cover is disposed over the spacer material. A desiccant is supported by the seat structure. The thermal seat manifold thermodynamically influences a relative temperature of the trim cover through both the carrier and the desiccant.

According to yet another aspect of the present invention, a climate control system for a vehicle seating assembly includes a seat carrier having a thermal seat manifold through which a fluid is routed. A spacer member is positioned over the seat carrier. A trim cover is disposed over the spacer member. A desiccant is supported by the seat carrier. A matrix of fluid transfer lines thermodynamically influences a relative temperature of the trim cover through both the carrier and the desiccant.

These and other aspects, objects, and features of the present invention will be understood and appreciated by those skilled in the art upon studying the following specification, claims, and appended drawings.

DETAILED DESCRIPTION OF THE EMBODIMENTS

Figure 1:
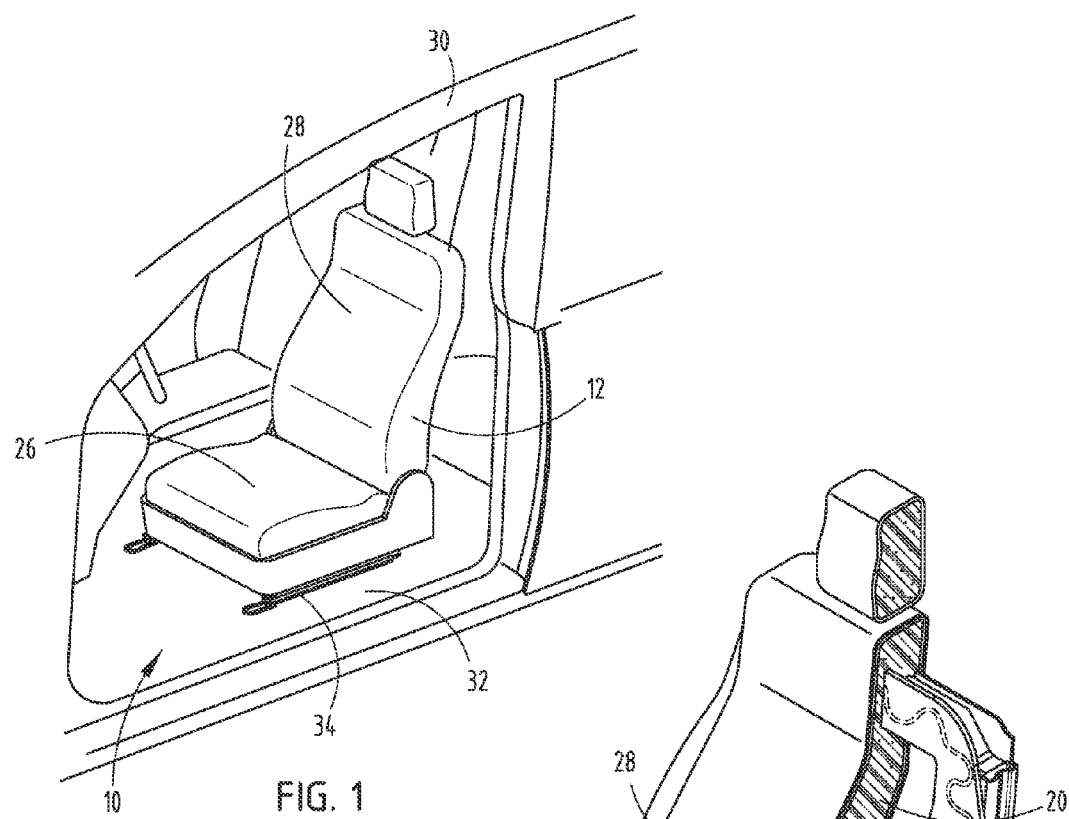
FIG. 1 is a top perspective view of one embodiment of a vehicle seating assembly of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-4, reference numeral 10 generally designates a vehicle seating assembly having a seat structure 12. A carrier 14 is disposed on the seat structure 12 and includes a matrix 16 of fluid transfer lines 18. A spacer material 20 is positioned over the carrier 14. A trim cover 22 is disposed over the spacer material 20. A desiccant layer 24 is made from a volcanic ash and is supported by the seat structure 12. The matrix 16 of fluid transfer lines 18 thermodynamically influences a relative temperature of the trim cover 22 through both the carrier 14 and the desiccant layer 24.

Figure 2:
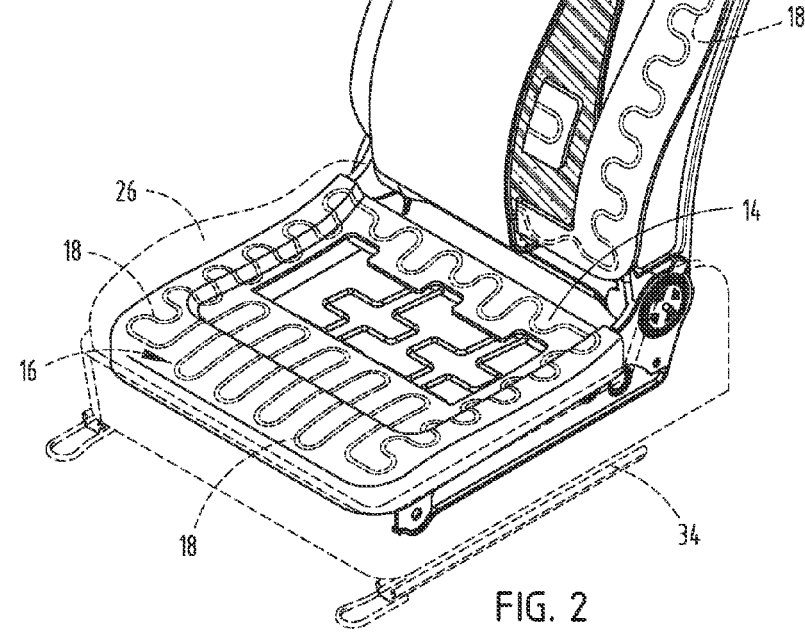
FIG. 2 is a top perspective view of the vehicle seating assembly of FIG. 1 with a portion of a seat back in cross-section.
Figure 2A:
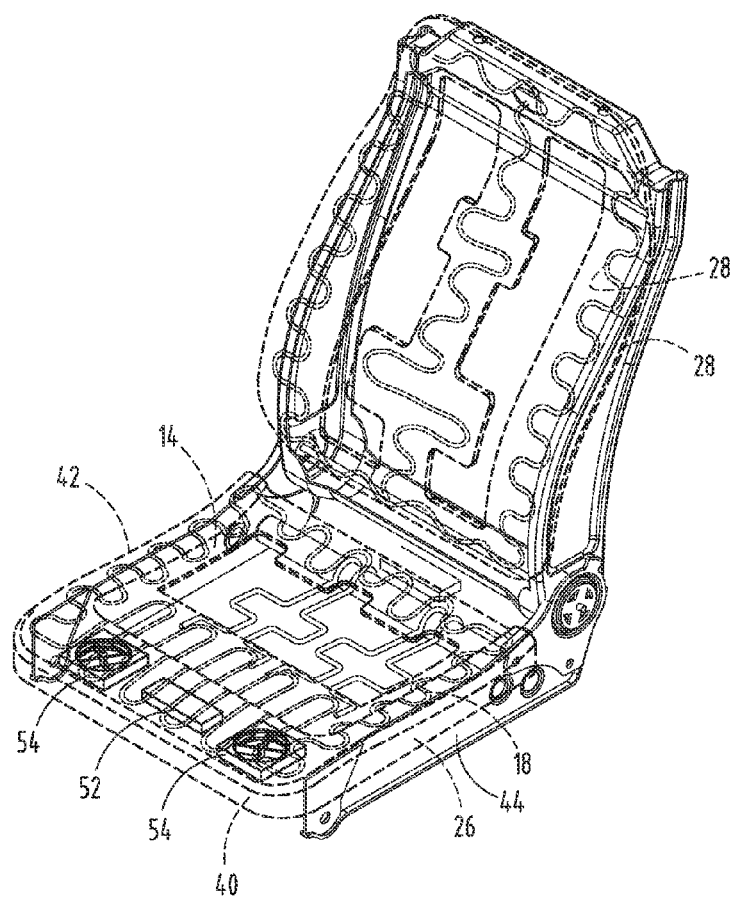
FIG. 2A is a top perspective view of the vehicle seating assembly of FIG. 1 with a seat cushion and a seat back cushion removed.

Referring now to FIGS. 1-2A, the vehicle seating assembly 10 is generally configured for use in a vehicle 30. As illustrated in FIG. 1, the seat structure 12 includes a seat 26 and a seat back 28 and is slidably engaged with a floor 32 inside the vehicle 30 and is adapted to move between forward and rearward positions on slide rails 34. The vehicle seating assembly 10 illustrated includes a base 40 having first and second side supports 42, 44. The first and second side supports 42, 44 generally receive a load from the weight of a passenger and transition that load to the floor 32 of the vehicle 30. The first and second side supports 42, 44 also support the seat structure 12. The seat structure 12 includes the carrier 14 that may be constructed from materials such as fiberglass or plastic. The carrier 14 includes the matrix 16 of fluid transfer lines 18. The matrix 16 of fluid transfer lines 18 extends through and around the carrier 14 above a thermoelectric device 52 or above one or more fans 54 or above both the thermoelectric device 52 and the one or more fans 54. The fluid transfer lines 18 include a fluid 56, such as a phase change material, which may include liquid or air, that flows through the fluid transfer lines 18 and effectively cools or warms the carrier 14, and consequently, the seat structure 12 generally. The fluid transfer lines 18 may be operably linked through the seat structure 12. Specifically, the seat back 28 and the fluid transfer lines 18 in the seat 26 and in the seat back 28 can define one long tube. Alternatively, the fluid transfer lines 18 may include separate and distinct systems configured to warm or cool the buttocks of a passenger separately from the back of a passenger. The trim cover 22 may include an air permeable cloth material that allows sufficient air to pass therethrough. Alternatively, the trim cover 22 may include a leather material that allows sufficient air permeability by way of perforations or the like.

Figure 3:
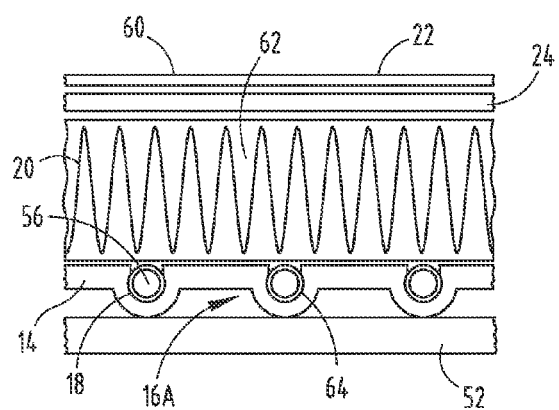
FIG. 3 is a side schematic view of one embodiment of a portion of a climate control system of the present invention.
Figure 4:
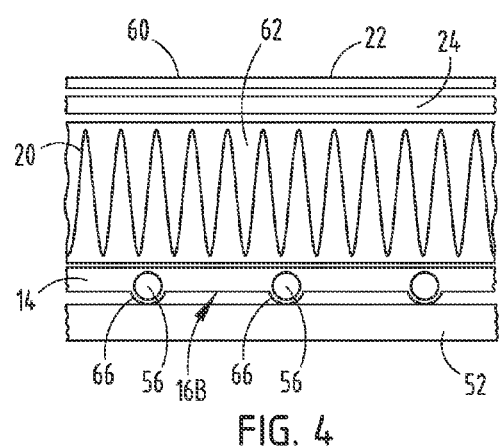
FIG. 4 is a side schematic view of another embodiment of a portion of a climate control system of the present invention.

Referring now to FIGS. 3 and 4, the general configuration of the seat 26 and the seat back 28 is illustrated. For purposes of brevity, the seat 26 is illustrated in FIGS. 3 and 4. However, it will be generally understood by one having ordinary skill in the art that the cross-section shown in FIGS. 3 and 4 could also be employed in the seat back 28, and that other close derivatives thereof may also be utilized. The spacing of the fluid transfer lines 18 and the diameter of the fluid transfer lines 18 can vary, depending on the desired performance and thermodynamic effect expected. The spacer member 20 is generally constructed from a low-density material.

The embodiment depicted in FIG. 3 illustrates the trim cover 22 extending over the desiccant layer 24. The desiccant layer 24 may be constructed from any of a variety of materials, including volcanic ash. The desiccant layer 24 is part of a moisture control system that effectively minimizes moisture collection at or near a surface 60 of the trim cover 22. The desiccant layer 24 has the effect of keeping the surface 60 dry, thereby increasing the overall effectiveness of the warming and cooling effect of the climate control system. The climate control systems also include the spacer material 20, which may be a low-density spacer fabric 62. The spacer fabric 62 has exceptional resiliency and relative strength, while also allowing substantial flexure to provide a comfortable supporting surface to passengers. The low-density of the spacer fabric 62 allows for substantial airflow therethrough. The spacer fabric 62 is supported over the carrier 14, which is configured to receive the fluid transfer lines 18. As illustrated in FIG. 3, the fluid transfer lines 18 are distinct, separate lines that are inserted into voids 64 disposed or defined in the carrier 14. Thus, the carrier 14 defines a matrix 16A through which distinctly separate fluid transfer lines 18 extend. Alternatively, as shown in FIG. 4, the carrier 14 may define elongate passages 66 that generally define a matrix 16B through which the fluid 56 passes, such that separate and distinct fluid transfer lines 18 are not necessary.

As noted above, air movement systems may be disposed proximate to the carrier 14. Specifically, in one embodiment, one or more thermoelectric devices 52, one or more fans 54, or both are routed below the carrier 14. The thermoelectric devices, which may be in the form of a Peltier device that utilizes the Peltier effect, are generally configured to heat or possibly cool the carrier 14. As the carrier 14 is cooled, the fluid transfer lines 18 are also cooled, which has the effect of cooling the air disposed in the spacer fabric 62. The cool air in the spacer fabric 62 has the effect of cooling the buttocks or back of a passenger seated on or resting against the vehicle seating assembly 10. One or more fans 54 can also be used, in which case the one or more fans 54 may blow warm or cool air through the spacer fabric 62, through the desiccant layer 24 and the trim cover 22 to cool the buttocks and back of a passenger or to warm the buttocks and back of a passenger.

Figure 5:
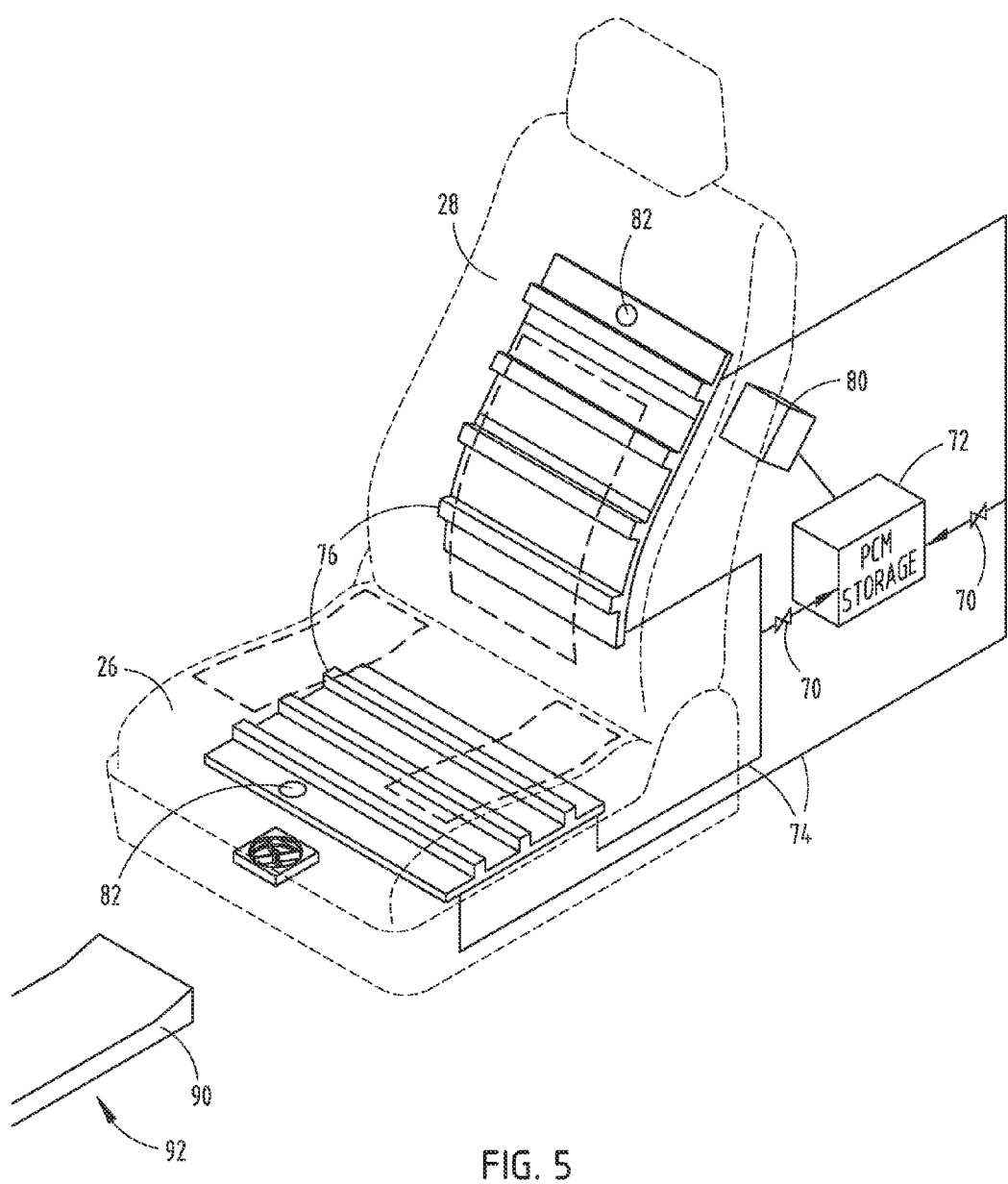
FIG. 5 is a top schematic view of one embodiment of a climate control system of the present invention.

Referring now to the embodiment depicted in FIG. 5, in the illustrated climate control system, the fluid 56, which is a working fluid and may include a phase change material, is stored proximate the vehicle seating assembly 10. The fluid 56, as noted above, may be a gas or a liquid that provides a desired heat exchange rate between a passenger and the seat 26. Control valves 70 are disposed between a storage unit 72 and the seat 26, and control the flow of fluid 56 through the storage unit 72 to the seat 26. The fluid 56 acts as a thermal battery. The storage unit 72 holds the fluid 56 and can act as a thermal source to charge (add heat) to the fluid 56 if the user desires for the seat 26 and seat back 28 to warm the buttocks and back of the user. Alternatively, the storage unit 72 can act as a heat sink and can draw heat from the fluid 56 in the event the user wishes to be cooled by the seat 26 and seat back 28. Relay lines 74 relay the fluid 56 to seat manifolds 76 disposed in the seat 26. As illustrated in FIGS. 2 and 2A, the seat manifolds 76 are defined by the carrier 14 with the fluid transfer lines 18 extending therethrough. Distribution layers, such as the spacer material 20, the desiccant layer 24, and the trim cover 22, are disposed above the seat manifolds 76 and have the effect of providing heat or drawing heat from a passenger. A pump 80 draws the fluid 56 through the seat manifolds 76, which draw heat from or apply heat to a passenger. The trim cover 22 may include a perforated fabric or leather to assist in increasing the thermal conductivity of the vehicle seating assembly 10. It is generally contemplated that a thermistor or a thermopile 82 may be disposed in both the seat 26 and the seat back 28 to monitor the relative temperature at an interface between the back of a passenger and the seat back 28, as well as at the buttocks of a passenger and the seat 26. Air from a duct 90 coupled to a heating, ventilation, and air-conditioning system extends through a duct 92 to a position below the seat 26. Airflow below and through the seat 26 is routed through the spacer fabric 62 to improve body heat transfer and "re-charge" the desiccant layer 24 by drying out the material to continuously promote perspiration control.

Figure 6:
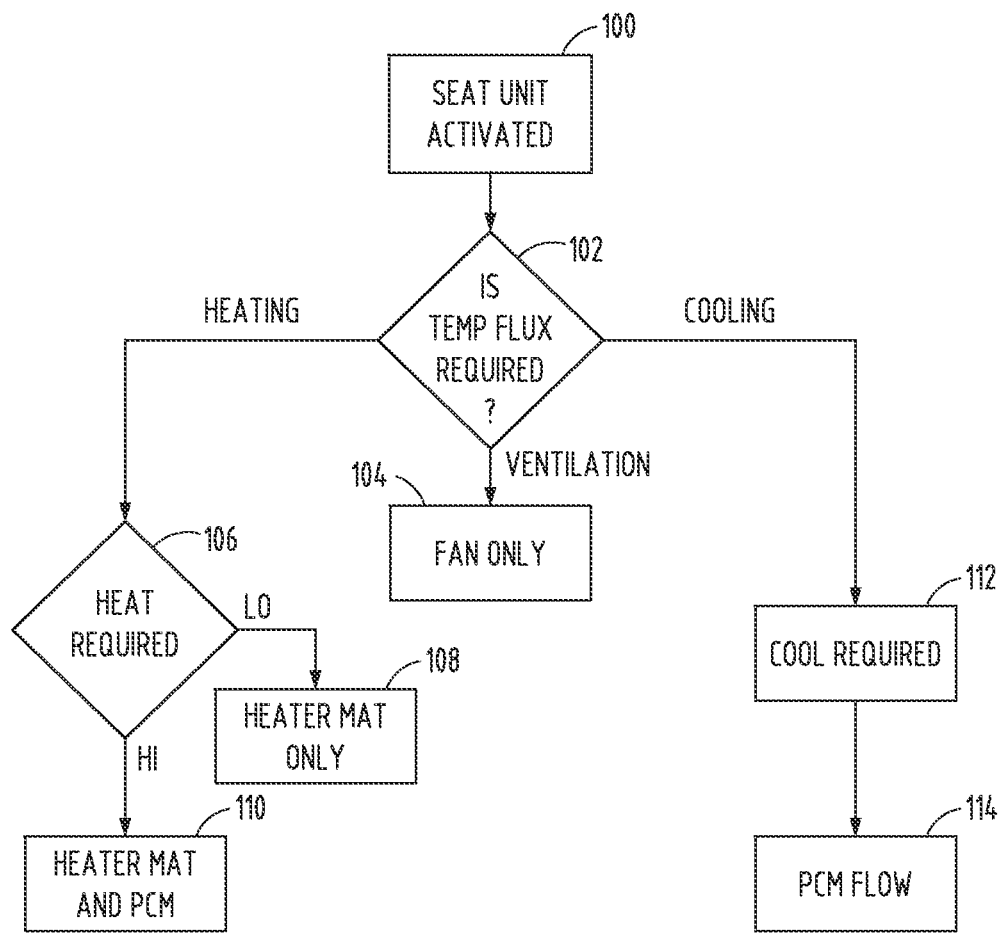
FIG. 6 is a flow diagram illustrating the logic related to one embodiment of the climate control system of the present invention.

Referring now to FIG. 6, in one embodiment of the present invention, logic for the vehicle seating assembly 10 operates as follows. In a first step 100, a temperature control system is activated. A passenger then activates a thermistor switch, which initiates a heating or cooling sequence based on the desired temperature of the passenger (step 102). If the passenger desires only additional ventilation and is already at a desired temperature, then the fan can be activated (step 104). In the event that the passenger desires that the seat be warmed (step 106), a heater mat can be activated (step 108), or the heater mat and the phase change material can be activated (step 110). If only the heater mat is activated, the seat or the seat back or the seat and the seat back may be minimally heated. In the event that the phase change material is activated, the pump will begin to move warmed fluid through the fluid transfer lines, thus warming the carrier and the seat structure of the vehicle seating assembly 10. In the event that the passenger desires for the seat structure to be cooler (step 112), the phase change material flow can be activated with the fluid in a cooled state (step 114), which consequently cools down the seat structure of the vehicle seating assembly 10, and consequently cools the buttocks or back or both of the passenger.

Although the illustrations and diagrams set forth above generally depict systems that are connected in series, it is also contemplated that the various systems discussed herein, including variations on the climate control system can operate in parallel. For example, the seat 26 and the seat back 28 may each be connected to a climate control system as set forth herein such that fluid flows from the seat 26 to the seat back 28 or from the seat back 28 to the seat. 26. Alternatively, the seat 26 may be operably coupled directly with a first loop.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle seating assembly comprising:
   first and second supports;
   a carrier coupled to and spanning between the first and second supports and including a plurality of channels on opposing sides of the carrier having a matrix of fluid transfer lines disposed therein;
   a spacer material positioned over the carrier;
   a trim cover disposed over the spacer material; and
   a desiccant made from a volcanic ash and supported by the seat structure, wherein the matrix of fluid transfer lines defines a closed loop system that thermodynamically influences a relative temperature of the trim cover through both the carrier and the desiccant.

2. The vehicle seating assembly of claim 1, wherein the desiccant is disposed between the trim cover and the spacer material.

3. The vehicle seating assembly of claim 1, wherein the carrier defines an aperture therein and the matrix of fluid lines substantially encompasses the aperture.

4. The vehicle seating assembly of claim 1, wherein the matrix of fluid transfer lines are separate and distinct lines held in place by receiving channels disposed in the carrier.

5. The vehicle seating assembly of claim 1, further comprising:
   an air movement system disposed in communication with the spacer material.

6. The vehicle seating assembly of claim 1, wherein a gas is routed through the matrix of fluid transfer lines.

7. A vehicle seating assembly comprising:
   a carrier supporting a thermoelectric device and a desiccant, the carrier having pre-defined voids disposed therein and a thermal seat manifold disposed within the voids through which a fluid is routed, the thermal seat manifold thermodynamically influencing a relative temperature of a trim cover;
   a storage unit configured to hold the fluid; and
   a spacer material disposed between the carrier and the trim cover.

8. The vehicle seating assembly of claim 7, further comprising:
   one of a thermopile and a thermistor disposed proximate the trim cover for measuring a relative temperature of a passenger.

9. The vehicle seating assembly of claim 7, wherein a phase change material is routed through the thermal seat manifold and stored in a phase change material container.

10. The vehicle seating assembly of claim 7, wherein the desiccant includes volcanic ash.

11. The vehicle seating assembly of claim 7, wherein the carrier defines an aperture therein and the matrix of fluid lines substantially encompasses the aperture.

12. The vehicle seating assembly of claim 11, wherein the matrix of fluid transfer lines are separate and distinct lines held in place by the channels disposed in the carrier.

13. The vehicle seating assembly of claim 7, further comprising:
   an air movement system disposed in communication with the spacer material.

14. A climate control system for a vehicle seating assembly comprising:
   a seat carrier defining an aperture therein and including a thermal seat manifold within the seat carrier that substantially encompasses the aperture;
   a fluid line within the manifold routing a fluid therethrough, the fluid line disposed in pre-defined voids formed in the seat carrier; and
   a trim cover disposed over a spacer member and a desiccant.

15. The climate control system of claim 14, further comprising:
   a pump that forces fluid through the thermal seat manifold.

16. The climate control system of claim 14, further comprising:
   an air movement system disposed in communication with the spacer member.

17. The climate control system of claim 14, wherein the fluid lines thermodynamically influence a relative temperature of the cover through the carrier and the desiccant.

18. The climate control system of claim 14, further comprising:
   one of a thermopile and a thermistor disposed proximate the trim cover for measuring the relative temperature of a passenger.

19. The climate control system of claim 14, wherein the spacer member is constructed from a non-woven low-density material.

20. The climate control system of claim 14, further comprising:
   a desiccant supported by the seat carrier.

* * * * *